(12) United States Patent
Bourassi et al.

(10) Patent No.: US 12,397,748 B2
(45) Date of Patent: Aug. 26, 2025

(54) ELECTRONIC UNIT FOR CONTROLLING AUTOMOTIVE VEHICLE AND METHOD OF MONITORING FUNCTIONALITIES OF THE AUTOMOTIVE VEHICLE BY MEANS OF A MOBILE TERMINAL

(71) Applicant: VALEO COMFORT AND DRIVING ASSISTANCE, Créteil (FR)

(72) Inventors: Abdelhafid Bourassi, Créteil (FR); Hervé Parvery, Créteil (FR); José Robineau, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 1097 days.

(21) Appl. No.: 15/758,995

(22) PCT Filed: Sep. 9, 2016

(86) PCT No.: PCT/EP2016/071382
§ 371 (c)(1),
(2) Date: Sep. 18, 2020

(87) PCT Pub. No.: WO2017/042374
PCT Pub. Date: Mar. 16, 2017

(65) Prior Publication Data
US 2021/0009079 A1   Jan. 14, 2021

(30) Foreign Application Priority Data
Sep. 11, 2015 (FR) ..................................... 1558500

(51) Int. Cl.
*B60R 25/24* (2013.01)
*B60R 25/01* (2013.01)
*H01Q 1/32* (2006.01)

(52) U.S. Cl.
CPC ............ *B60R 25/245* (2013.01); *B60R 25/01* (2013.01); *H01Q 1/3241* (2013.01); *B60R 2325/101* (2013.01); *B60R 2325/205* (2013.01)

(58) Field of Classification Search
CPC ..................................................... B60R 25/245
See application file for complete search history.

(56) References Cited

U.S. PATENT DOCUMENTS

| | | | |
|---|---|---|---|
| 2004/0142732 A1 | 7/2004 | Ueda et al. | |
| 2006/0093055 A1* | 5/2006 | Goldberg | H01Q 1/241 375/267 |

(Continued)

FOREIGN PATENT DOCUMENTS

| | | |
|---|---|---|
| DE | 198 45 649 A1 | 4/2000 |
| FR | 2 832 510 A1 | 5/2003 |

(Continued)

OTHER PUBLICATIONS

Google Translation of French publication FR2832510A1 2001.*

(Continued)

*Primary Examiner* — Jean Paul Cass
(74) *Attorney, Agent, or Firm* — Osha Bergman Watanabe & Burton LLP (57) ABSTRACT

The invention relates to an electronic control unit (11) intended for equipping an automotive vehicle, comprising:—a first antenna (16A), and—a controller (12) which is connected to said first antenna and which is suitable for controlling a functionality of the vehicle as a function of signals exchanged with a mobile terminal (20) via said first antenna. According to the invention, the electronic control unit comprises at least one second antenna (16B) which exhibits electromagnetic properties and/or a position which are different from those of said first antenna and to which the controller is connected in such a way that the controller is suitable for controlling one or more functionalities of the (Continued)

vehicle as a function of signals exchanged with the mobile terminal via said second antenna.

12 Claims, 2 Drawing Sheets

(56) References Cited

U.S. PATENT DOCUMENTS

| | | | | |
|---|---|---|---|---|
| 2015/0365955 A1* | 12/2015 | Liu | ........................ | H01Q 1/246 |
| | | | | 370/329 |
| 2016/0294053 A1* | 10/2016 | Boutayeb | ................ | H01Q 13/00 |
| 2018/0108992 A1* | 4/2018 | Chen | ....................... | H01Q 13/20 |

FOREIGN PATENT DOCUMENTS

| | | | | |
|---|---|---|---|---|
| GB | 2318915 A | * | 5/1998 | ............. H01Q 1/288 |
| JP | 2015-113643 A | | 6/2015 | |

OTHER PUBLICATIONS

Google Translationj of German Pub. DE19845549A1.*
Google Translation of Japanese Pub. JP2015113643.*
Google Patents translation of WO 2017042374 A1.*
International Search Report issued in PCT/EP2016/071382 mailed on Dec. 20, 2016 (2 pages).
Written Opinion of the International Searching Authority issued in PCT/EP2016/071382 mailed on Dec. 20, 2016 (8 pages).

* cited by examiner

ELECTRONIC UNIT FOR CONTROLLING AUTOMOTIVE VEHICLE AND METHOD OF MONITORING FUNCTIONALITIES OF THE AUTOMOTIVE VEHICLE BY MEANS OF A MOBILE TERMINAL

TECHNICAL FIELD TO WHICH THE INVENTION RELATES

The present invention relates generally to the control of functionalities of a motor vehicle by means of a mobile terminal.

It relates more particularly to an electronic control unit intended to equip a motor vehicle, comprising an antenna and a controller which is connected to this antenna and which is suitable for controlling a functionality of the motor vehicle as a function of signals exchanged with a mobile terminal via the antenna.

It relates also to a method for controlling access to at least one functionality of a motor vehicle by a user equipped with a mobile terminal.

The invention applies particularly advantageously to the case where the functionality controlled is the unlocking of the doors of the vehicle or the starting of the engine of the vehicle.

TECHNOLOGICAL BACKGROUND

It has been proposed to control certain functionalities of a motor vehicle, such as the unlocking of the doors or the starting of the engine, by means of a mobile terminal, for example a cell phone commonly used by the owner of the vehicle.

The request to access the functionalities of the motor vehicle can then be initiated by an action of the user, for example by pressing on a button of the mobile terminal. It can also be initiated automatically, for example when the user is detected to be arriving in immediate proximity of the motor vehicle or as entering into the interior of the vehicle.

For that, the electronic control unit embedded in the vehicle is equipped with an antenna allowing it to communicate with the mobile terminal. For cost reasons, this antenna is generally placed on the electronic circuit of embedded electronic control unit.

Before authorizing any access to the functionality of the motor vehicle, provision is made, for security reasons, for the electronic control unit to check whether the bearer of the mobile terminal is in proximity to the motor vehicle. Thus, by way of illustrative example, if the user moves away from his or her vehicle then an ill-intentioned person enters into it and tries to start up the vehicle, this startup will be prohibited to him or her because of the distance separating the vehicle from the bearer of the mobile terminal.

In more detail, if the user commands the unlocking of the doors by pressing on a button of the mobile terminal, it is desirable to check that this distance is less than a first threshold (generally of the order of twenty or so meters).

To command the automatic unlocking of the doors when the user is detected approaching the vehicle, it is desirable to check that this distance is less that a second threshold (generally of the order of one to five meters).

To command the automatic starting of the engine of the vehicle, it is desirable to check that this distance is less than a third threshold (generally less than a meter, which makes it possible to ensure that the user has entered into the interior of the vehicle).

The major problem is that it proves, in practice, extremely difficult to determine accurately the distance separating the vehicle from the mobile terminal.

One method for determining this distance could consist in measuring the electromagnetic strength received by the antenna. In effect, theoretically, the loss of strength of the signal between its transmission by the mobile terminal and its reception by the antenna is a function of the distance separating these two elements.

In practice, this method does not give results that are sufficiently reliable to be used, for the following reasons.

The first reason is that the antenna exhibits a non-isotropic radiation pattern. To put it another way, the strength transmitted by the antenna is not the same in all the directions of space. Likewise, the strength received by the antenna varies according to the direction from which the signal originates. So, by way of example, the measured electromagnetic strength will not be the same depending on whether the bearer of the mobile terminal is located 10 meters in front of the vehicle or 10 meters behind the vehicle.

The second reason is that the signal is subject to strong variations because of the environment in which the antenna is located, variations which cannot be predicted or assessed. Thus, when the antenna is situated in the interior of the vehicle, the signal is reflected several times before being received by the antenna. The signal is also attenuated on passing through various obstacles that it encounters.

Consequently, it seems difficult to know, with sufficient acuity, the distance between the bearer of the mobile terminal and the antenna with which the motor vehicle is equipped.

Moreover, the non-isotropic nature of the antenna does not make it possible to ensure a good transmission of the signal between the antenna and the mobile terminal whatever the position thereof in relation to the motor vehicle which can prove awkward for the user, for example when he or she wants to remotely lock the doors of his or her vehicle.

OBJECT OF THE INVENTION

In order to remedy the abovementioned drawbacks of the prior art, the present invention proposes an electronic control unit as defined in the introduction, in which there is provided at least one second antenna which exhibits electromagnetic properties and/or a position that are different from those of the other antenna and to which the controller is connected such that the controller is suitable for controlling the functionality of the vehicle as a function of signals exchanged with the mobile terminal via this second antenna.

Thus, by virtue of the invention, it is possible, by processing the strength levels of the signals received via each of the antennas, to obtain a better estimation of the distance separating the mobile terminal from the motor vehicle.

It is also possible, by using the successive strength levels of the signals received via the two antennas, to determine with good accuracy whether the mobile terminal is located in or outside of the interior of the motor vehicle.

Moreover, by virtue of the invention, it is possible to ensure a better transmission of the data exchanged between the controller and the mobile terminal, by using just one of the two signals: that whose strength level is the highest.

Other advantageous and non-limiting features of the electronic control unit according to the invention are as follows:

the first and second antennas exhibit different positions in that they are situated at a distance from one another greater than a quarter of the minimum wavelength used to communicate with the mobile terminal;

the first and second antennas exhibit different positions in that they are oriented in directions inclined relative to one another by an angle greater than 10 degrees;

the first and second antennas exhibit different electromagnetic properties in that they exhibit radiation patterns of different forms; and the first antenna exhibits a radiation pattern whose main lobes are oriented in different directions from those of the main lobes of the radiation pattern of the second antenna.

The invention also proposes a method for controlling access to at least one functionality of a motor vehicle by a user equipped with a mobile terminal, said motor vehicle being equipped with an electronic control unit as specified above, comprising the steps:

a) of transmission by the mobile terminal, or respectively by the controller, of a transmitted signal, b) of reception by the controller, or respectively by the mobile terminal, of a first received signal having passed through the first antenna and exhibiting a first strength level and of a second received signal having passed through the second antenna and exhibiting a second strength level, c) of measurement of the first and second strength levels, d) of verification, during which the controller verifies that the mobile terminal is authorized to access said functionality, this step being applied as a function of the first and second strength levels, and, e) if the mobile terminal is authorized to access said functionality, of authorization during which the electronic control unit authorizes access to said functionality.

Other advantageous and non-limiting features of the method according to the invention are as follows:

in the step d), the controller uses only the received signal whose strength level is the highest;

in the step c), provision is made to assess the distance separating the electronic control unit from the mobile terminal, as a function of the first and second strength levels, and, in the step d), the mobile terminal is authorized to access said functionality only if said distance is less than a predetermined threshold;

in the step c), said distance is assessed by means of a mathematical function which is applied to said first and second strength levels and which makes it possible to distinguish the case where said mobile terminal is situated in the interior of the motor vehicle from the case where said mobile terminal is situated outside the interior of the motor vehicle;

said mathematical calculation consists of a mathematical combination of said first and second strength levels, preferentially as a geometrical mean of said first and second strength levels;

in the step a), the transmitted signal is transmitted by the mobile terminal, and the steps b) to e) are applied by the controller; or in the step a), the transmitted signal is transmitted by the controller, and the steps b) and c) are applied by the mobile terminal.

DETAILED DESCRIPTION OF AN EXEMPLARY EMBODIMENT

The following description in light of the attached drawings, given by way of non-limiting examples, will give a good understanding of how the invention is composed and how it can be produced.

Figure 1:
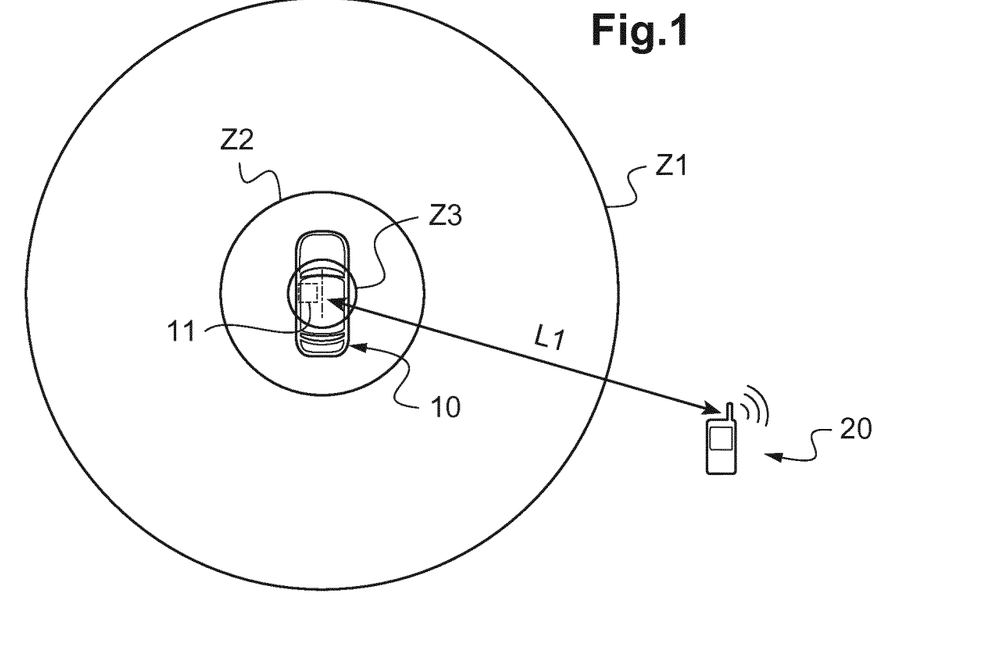
FIG. 1 is a schematic view of a mobile terminal and of a motor vehicle equipped with an electronic control unit according to the invention.

In the attached drawings:

FIG. 1 represents an example of context in which the invention can be implemented.

In this context, a motor vehicle 10 comprises an electronic control unit 11 (or ECU) which can enter into communication, via a wireless link, with a mobile terminal 20 in order to exchange data with this mobile terminal 20. This exchange of data notably makes it possible to control functionalities of the motor vehicle 10 by means of the mobile terminal 20 (such a functionality for example being able to be the unlocking of the doors of the motor vehicle 10 or the starting of the engine of the vehicle).

The mobile terminal 20 will preferentially be a portable telephone (or cell phone), possibly of "smart phone" type to use the term commonly used. As a variant, it could be a remote control, a connected watch, a pair of connected spectacles, a computer tablet, etc.

The wireless link used to communicate between the electronic control unit 11 and the mobile terminal 20 is here of Bluetooth type. As a variant, another communication protocol with short or medium range (of the order of a hundred or so meters) could be used.

Figure 2:
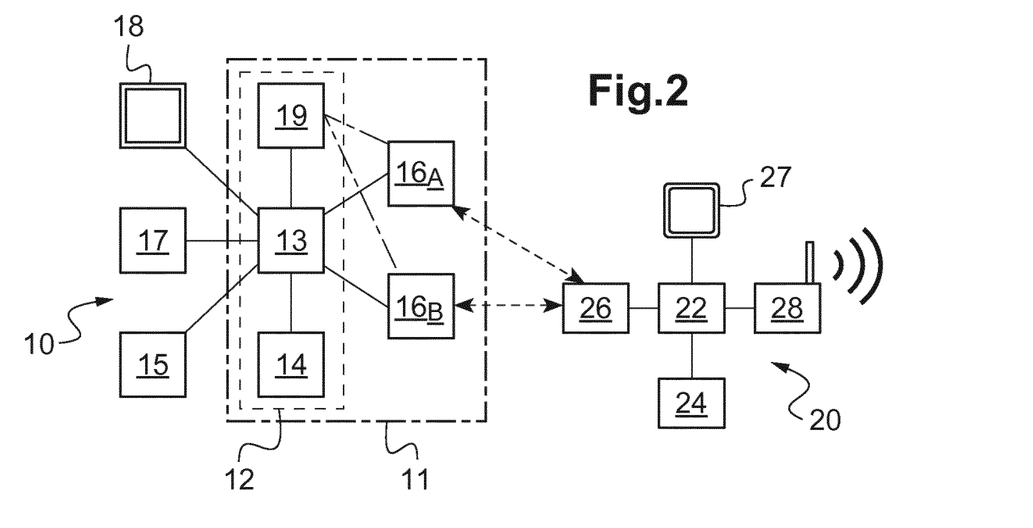
FIG. 2 schematically represents components of the motor vehicle and of the mobile terminal of FIG. 1, useful to understanding the invention.

FIG. 2 schematically represents components of the motor vehicle 10 and of the mobile terminal 20, useful to understanding the invention.

In this figure, it can be seen that in addition to the electronic control unit 11 already mentioned, the motor vehicle 10 comprises a first actuator 15 (here designed to allow the unlocking of the doors of the motor vehicle 10), a second actuator 17 (here designed to allow the starting of the vehicle) and a user interface 18 (here designed to allow the driver to input information).

As this FIG. 2 shows, the electronic control unit 11 comprises a controller 12 which is suitable for controlling the actuators 15, 17 and which is suitable for communicating with the user interface 18.

According to a particularly advantageous feature of the invention, the electronic control unit 11 also comprises a first antenna 16A and a second antenna 16B which exhibit electromagnetic properties and/or positions that are different, and which are connected to the controller 12 such that the latter can generate a control setpoint for the actuators 15, 17 as a function of signals exchanged with the mobile terminal 20 via one and/or the other of these two antennas 16A, 16B.

In the embodiment represented in FIG. 2, the controller 12 comprises a processor 13 and a storage unit 14, for example a rewriteable non-volatile memory.

The storage unit 14 in particular stores computer programs comprising instructions whose execution by the processor 13 allows the implementation by the electronic control unit 11 of the method described above.

The storage unit 14 also stores invariable data used in the context of the method described above, notably three distance thresholds $L_{seuil1}$, $L_{seuil2}$, $L_{seuil3}$.

The controller 12 also comprises measurement means 19 making it possible to continuously measure:
- a first strength level $RSSI_A$ ("Received Signal Strength Indication") corresponding to the strength in reception of the signal received by the first antenna $16_A$, and
- a second strength level $RSSI_B$ corresponding to the strength in reception of the signal received by the second antenna $16_B$.

These two strength levels make it possible to provide an indication as to the intensity of the signal received by each antenna.

As FIG. 2 also shows, the mobile terminal 20, which, it will be recalled, is, here, a cell phone, comprises a processor 22, a memory 24 (for example a rewritable non-volatile memory), a user interface 27, a short or medium range communication module 26 and a long range communication module 28.

The user interface is, here, formed by the touch screen of the cell phone. As a variant, it could be a keyboard or a button (in the variant where the mobile terminal would be a simple remote control).

The memory 24 makes it possible in particular for the mobile terminal 20 to store a user application, intended to facilitate the control of the functionalities of the vehicle by means of this mobile terminal 20.

The short or medium range communication module 26 of the mobile terminal 20 comprises an antenna which allows the processor 22 of the mobile terminal 20 to establish a wireless link (here, of Bluetooth type as already indicated) with the controller 12 of the electronic control unit 11 via the two antennas $16_A$, $16_B$.

Finally, the long range communication module 28 allows the mobile terminal 20 to exchange data over the mobile telephony network.

As has already been indicated above, the two antennas $16_A$, $16_B$ of the electronic control unit 11 exhibit different electromagnetic properties and/or positions.

The benefit is that, when the mobile terminal 20 transmits one and the same signal (via its single antenna), the controller 12 receives, via the two antennas $16_A$, $16_B$, two different signals.

In this way, the controller 12 will be able to use these signal differences in order to:
- optimize the quality of the connection between the mobile terminal 20 and the electronic control unit 11,
- increase the accuracy of the determination of the distance L1 separating the motor vehicle 10 from the mobile terminal 20 (see FIG. 1), and thus
- secure the access to the functionalities of the vehicle (unlocking of the doors and starting of the engine).

More specifically, the positions of the two antennas $16_A$, $16_B$ will be able to be qualified as different:
- if these two antennas $16_A$, $16_B$ are situated at a distance from one another which is greater than a quarter of the minimum wavelength used to communicate with the mobile terminal 20, and/or
- if these two antennas $16_A$, $16_B$ are oriented in directions that are inclined relative to one another by an angle greater than 10 degrees.

Here, since the communication protocol used is Bluetooth, the abovementioned minimum wavelength is equal to 0.3/2.4835 meter.

Figure 3:
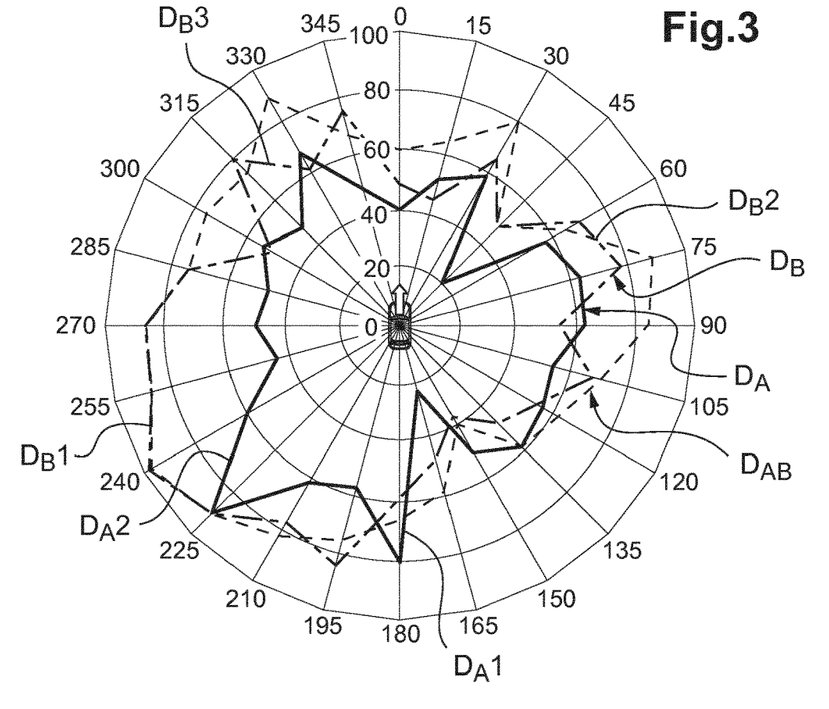
FIG. 3 represents the radiation patterns of the two antennas of the electronic control unit of FIG. 1.

Moreover, the electromagnetic properties of the two antennas $16_A$, $16_B$ will be able to be qualified as different if their radiation patterns $D_A$, $D_B$ exhibit different forms (see FIG. 3).

It will be recalled on this subject that the radiation pattern of a radio frequency antenna is the graphic representation of the distribution in space (two-dimensional or three-dimensional) of a quantity characterizing the radiation of the antenna. In FIG. 3, this quantity is, here, the strength transmitted by the antenna.

The radiation patterns $D_A$, $D_B$ make it possible to visualize the main transmission and reception lobes $D_A1$, $D_A2$, $D_B1$, $D_B2$, $D_B3$ of each antenna $16_A$, $16_B$, that is to say the directions in which the antennas $16_A$, $16_B$ radiate best.

Preferentially, the two antennas $16_A$, $16_B$ are positioned relative to one another in such a way that the main transmission and reception lobes $D_A1$, $D_A2$ of the first antenna $16_A$ are oriented in directions different from those of the main transmission and reception lobes $D_B1$, $D_B2$, $D_B3$ of the second antenna $16_B$.

Thus, it will be possible to provide for the two antennas $16_A$, $16_B$ to be oriented such that the main transmission and reception lobe of one of the antennas is oriented in the direction where the transmission and reception strength of the other antenna is lowest.

The objective is for the envelope circumscribed on these two radiation patterns $D_A$, $D_B$ to be as circular as possible (that is to say, as isotropic as possible), such that the quality of the exchanges between the mobile terminal 20 and the electronic control unit 11 is substantially the same, regardless of the relative angular position of the mobile terminal 20 in relation to the motor vehicle 10.

Thus, if the transmission and reception strength of one of the antennas is very low in a given direction (which generates a shadow zone in which this antenna will not be able to communicate with the mobile terminal), the other antenna will be able to allow this shadow zone to be masked.

In practice, for cost reasons, the two antennas $16_A$, $16_B$ are here installed on the electronic circuit board of the electronic control unit 11, the very one which bears the processor 13 and the measurement means 19.

As a variant, they could be placed at a distance from this electronic circuit board, inside or outside the interior of the vehicle, and inside or outside the bodywork of the vehicle.

As has been explained above, the benefit of the device described above is to allow the bearer of the mobile terminal 20 to access the functionalities of the motor vehicle 10 either manually (by using the user application and the touch screen 27 of the mobile terminal 20), or automatically (by detecting the position of the mobile terminal 20 in relation to the motor vehicle 10).

For that, the method is applied in five main steps a) to e) which, in summary, are implemented as follows.

During a step a), when it is within range of at least one of the antennas $16_A$, $16_B$ of the electronic control unit 11 of the motor vehicle 10, the mobile terminal 20 transmits a signal, called transmitted signal S1.

In the step b), this transmitted signal S1 is propagated to the two antennas $16_A$, $16_B$. In this way, the controller 12 receives two signals i.e.:
- a first received signal $S2_A$ which corresponds to a component of the transmitted signal S1 having been received by the first antenna $16_A$, and
- a second received signal $S2_B$ which corresponds to a component of the transmitted signal S1 having been received by the second antenna $16_B$.

In the step c), the measurement means 19 of the controller 12 measure the first and second strength levels $RSSI_A$, $RSSI_B$ of the first and second received signals $S2_A$, $S2_B$.

In the step d), the controller 12 verifies that the mobile terminal 20 is authorized to access said functionality. This step is applied as a function of the first and second measured strength levels $RSSI_A$, $RSSI_B$.

In the step e), if the mobile terminal 20 is authorized to access said functionality, the controller 12 commands one of the actuators 15, 17 to authorize the access to said functionality.

The step d), which constitutes the core of this method, will be able to be implemented in various ways.

It will in particular be able to be implemented differently according to the functionality to which the bearer of the mobile terminal 20 wants to have access and according to the nature by which the access is requested (automatically or manually).

In the present description, it will be possible to illustrate this method by distinguishing three particular cases.

The first particular case will be that in which the bearer will manually command the unlocking of the doors by using the user application stored in his or her mobile terminal 20. In this particular case, the method will make it possible to maximize the range of the exchanges between the mobile terminal 20 and the motor vehicle 10 in all the directions around this vehicle (quasi-isotropically). The method will here also make it possible, optionally, to verify that the distance between the bearer of the mobile terminal 20 and the motor vehicle 10 is less than a first distance threshold $L_{seuil1}$. This first distance threshold $L_{seuil1}$ corresponds to the circle Z1 illustrated in FIG. 1. It is chosen here to be between 10 and 20 meters.

The second particular case will be that where the electronic control unit 11 will detect that the bearer of the mobile terminal 20 is approaching the motor vehicle and he or she will automatically command the unlocking of the doors. In this particular case, the method will make it possible to verify that the distance between the bearer of the mobile terminal 20 and the motor vehicle 10 is less than a second distance threshold $L_{seuil2}$, strictly less than the first threshold $L_{seuil1}$. This second distance threshold $L_{seuil2}$ corresponds to the circle Z2 illustrated in FIG. 1.

It is chosen here to be between 2 and 10 meters.

The third particular case will be that in which the electronic control unit 11 will detect that the bearer of the mobile terminal 20 enters into the motor vehicle and that he or she will automatically command the starting of the engine. In this particular case, the method will make it possible to verify that the distance between the bearer of the mobile terminal 20 and the motor vehicle 10 is less than a third distance threshold $L_{seuil3}$, strictly less than the second distance threshold $L_{seuil2}$. This third distance threshold $L_{seuil3}$ corresponds to the circle Z3 illustrated in the FIG. 1. It is chosen here to be equal to 80 centimeters.

In these three particular cases, provision is therefore made to assess the distance L1 separating the electronic control unit 11 from the mobile terminal 20, such that, in the step d), the mobile terminal 20 is authorized to access the desired functionality only if said distance L1 is less than the corresponding distance threshold $L_{seuil1}$, $L_{seuil2}$, $L_{seuil3}$. As will be clearly described hereinbelow, this assessment will be made as a function of the first and second measured strength levels $RSSI_A$, $RSSI_B$.

Consider first of all the first case, that in which the bearer manually commands the unlocking of the doors using the touch screen 27 of the mobile terminal 20.

In the step a), the mobile terminal 20 therefore transmits a transmitted signal S1, constituting a request to unlock the doors.

As has been explained above, in the steps b) and c), two received signals $S2_A$, $S2_B$, respectively exhibiting strength levels $RSSI_A$, $RSSI_B$, are then acquired by the computer 12.

Then, prior to the step d), the controller 12 first of all uses these two received signals $S2_A$, $S2_B$ to estimate the distance L1 separating the mobile terminal 20 from the motor vehicle 10.

This estimation is made given the fact that, theoretically, the loss of strength of the signal between its transmission by the mobile terminal 20 and its reception by the antenna concerned is a function of the distance separating these two elements.

The storage unit 14 then stores a table which maps, to each measured strength level $RSSI_A$, $RSSI_B$, an estimated distance.

Since it acquires two received signals $S2_A$, $S2_B$, the controller 12 can then read from this table two estimated distances $L1_A$, $L1_B$.

Because the loss of strength of the signals is affected by numerous factors other than the distance separating the mobile terminal 20 from the antennas $16_A$, $16_B$, these two estimated distances $L1_A$, $L1_B$ are not generally equal.

Then, the controller 12 can estimate that the distance L1 separating the mobile terminal 20 from the motor vehicle 10 is equal to the arithmetical mean of the two estimated distances $L1_A$, $L1_B$, which can be written:

$$L1 = (L1_A + L1_B)/2$$

As a variant, the controller 12 could estimate the distance L1 otherwise.

As a preferential example, it could estimate the distance L1 by considering not the strength levels $RSSI_A$, $RSSI_B$ of a single pair of received signals $S2_A$, $S2_B$, but rather the strength levels $RSSI_A(k)$, $RSSI_B(k)$ of several pairs of received signals $S2_A(k)$, $S2_B(k)$, received at successive instants k.

In other words, in this variant, no longer will only a single pair of signals received at a given instant be considered, but several pairs of signals received over a time interval made up of a finite number of instants k. It will thus be possible to consider the last n instants k (the set of the last n instants k then forming what is called "a sliding time window").

For that, the controller 12 will be able to transmit successive requests to the mobile terminal 20 such that the latter returns a plurality of transmitted signals S1 at successive instants k. Then, the controller 12 will acquire several pairs of received signals $S2_A(k)$, $S2_B(k)$, respectively exhibiting strength levels $RSSI_A(k)$, $RSSI_B(k)$. It will then be able to read from the table stored in its storage unit 14 the corresponding values of the estimated distances $L1_A(k)$, $L1_B(k)$. Finally, it will be able to estimate the distance L1 as follows:

$$L1 = \frac{1}{N} \cdot \Sigma_{k=1}^{N} \frac{L1_A(k) + L1_B(k)}{2}$$

Whatever the case, once the distance L1 has been estimated, the controller 12 compares this distance L1 with the first distance threshold $L_{seuil1}$.

As long as this distance L1 is greater than the first distance threshold $L_{seuil1}$, the controller 12 interrupts the method, such that the doors remain locked.

On the other hand, if this distance L1 is less than or equal to the first distance threshold $L_{seuil1}$, which means that the mobile terminal 20 is situated in the zone embodied by the circle Z1 in FIG. 1, the controller 12 verifies whether the mobile terminal 20 is actually authorized to unlock the doors of the motor vehicle.

This operation consists in verifying that a valid virtual key is stored in the memory 24 of the mobile terminal 20.

This operation is performed by virtue of an exchange of information between the controller 12 and the mobile terminal 20. Since the content of this information is not the subject of the present invention, this exchange will not be described in more detail here.

It will on the other hand be possible to specify that, during this step d), the controller 12 will be able to use any one of the two antennas $16_A$, $16_B$ in order to communicate with the mobile terminal 20.

Here, advantageously, the controller 12 will use only the antenna $16_A$, $16_B$ though which has passed the received signal $S2_A$, $S2_B$ whose strength level $RSSI_A$, $RSSI_B$ was the highest.

In this way, the quality of the exchanges of information remains assured.

However, if, at a given moment, the communication is interrupted, the controller 12 will be able to try to use the other antenna in order to re-establish the exchange of information.

In a variant implementation of this first particular case it will be possible to envisage the computer not verifying that the distance L1 between the bearer of the mobile terminal 20 and the motor vehicle 10 is less than the distance threshold $L_{seuil1}$. In this variant, it will be estimated that if the connection has been able to be established between the mobile terminal 20 and the motor vehicle 10, that means that the mobile terminal 20 is at a sufficiently small distance from the motor vehicle 10 to be able to authorize the unlocking of the doors.

Now consider the second particular case, that where the unlocking of the doors is commanded automatically when the bearer of the mobile terminal 20 enters into the zone embodied by the circle Z2 in FIG. 1.

Initially, the electronic control unit 11 is still waiting to receive signals from the mobile terminal 20.

It then sends, via one and/or the other of its two antennas $16_A$, $16_B$ and at regular intervals, successive requests so as to detect the presence of the mobile terminal 20.

At this stage, the use of the two antennas makes it possible to maximize the range of this signal since, as has been explained above, the shadow zones of each antenna are masked by the other antenna.

Then, as soon as the presence of the mobile terminal 20 is detected, the electronic control unit 11 assesses the distance L1 separating it from the mobile terminal 20, as a function of the first and second strength levels $RSSI_A$, $RSSI_B$, in the same way as that described previously.

Then, the unlocking of the doors of the vehicle will be commanded automatically by the electronic control unit 11 as soon as this distance L1 becomes less than a predetermined threshold $L_{seuil1}$ (provided that the mobile terminal 20 stores a valid virtual key in its memory 24).

Finally consider the third particular case, that where the starting of the engine is commanded automatically, when the bearer of the mobile terminal 20 enters into the interior of the motor vehicle 10.

Here, the accuracy required to determine the distance between the mobile terminal 20 and the antennas $16_A$, $16_B$ of the electronic control unit 11 is very high, in as much as there is a desire to distinguish the case where the mobile terminal 20 is situated in the interior of the motor vehicle from the case where said mobile terminal 20 is situated outside the interior of the motor vehicle (in immediate proximity thereto).

The required accuracy is then less than a decimeter. Because of this, using the technique explained with reference to the first particular case for determining the distance L1 cannot be considered. The technique used is then as follows.

In response to the requests successively transmitted by the controller 12 to the mobile terminal 20, the latter transmits a plurality of transmitted signals S1.

As has been explained above, at each of these instants, two received signals $S2_A$, $S2_B$, respectively exhibiting strength levels $RSSI_A$, $RSSI_B$, are then acquired by the computer 12.

Then, the controller 12 uses these received signals $S2_A$, $S2_B$ to determine whether the mobile terminal 20 is situated inside or outside the interior of the motor vehicle 10.

For that, it applies a mathematical function $f$ to the first and second strength levels $RSSI_A$, $RSSIB$.

This mathematical function $f$ here consists of geometrical mean that can be written:

$$f(RSSI_A, RSSI_B) = (RSSI_A^2 \cdot RSSI_B^2)^{1/2}$$

The controller 12 will then estimate that the mobile terminal 20 is situated inside the interior of the motor vehicle 10 if the result of this mathematical function $f$ is greater than a given value (here −68 mW in logarithmic scale). On the other hand, it will be estimated that the mobile terminal 20 is situated outside the interior of the motor vehicle 10 if the result of this mathematical function $f$ is less than this given value.

This given value will be derived from measurements performed on a test bench.

Figure 4:
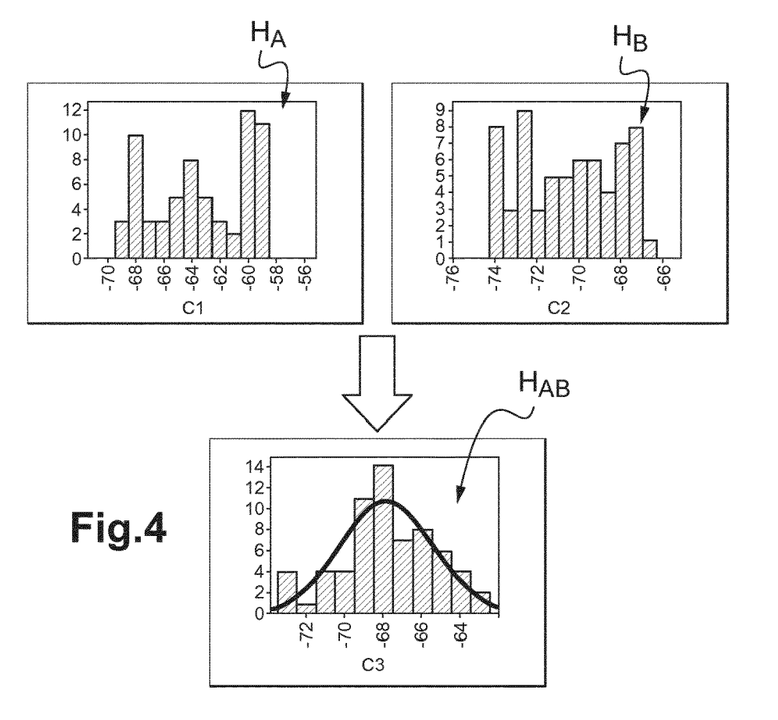
FIG. 4 represents, in the top part, two histograms illustrating the distribution of the strength levels of the signals received by each antenna for several positions of the mobile terminal in the interior of the motor vehicle, and, in the bottom part, a histogram illustrating the distribution of the geometrical means of said strength levels.

To understand the reason why this result makes it possible to determine the exact position of the mobile terminal 20, reference can be made to FIG. 4.

This FIG. 4 represents, in the top left-hand part, a histogram $H_A$ illustrating the distribution of the strength levels $RSSI_A$ of the signals $S2_A$ received via the first antenna $16_A$ for several positions of the mobile terminal 20 inside the interior of the motor vehicle 10.

FIG. 4 represents, in the top right-hand part, a histogram $H_B$ illustrating the distribution of the strength levels $RSSI_B$ of the corresponding signals $S2_B$ received via the second antenna $16_B$.

It can be seen in these two histograms $H_A$, $H_B$ that the distribution of the strength levels is fairly random.

FIG. 4 represents, in the bottom part, a histogram $H_{AB}$ illustrating the distribution of the geometrical means $f$ of the strength levels $RSSI_A$, $RSSI_B$ observed for each pair of signals $S2_A$, $S2_B$.

It can be seen in this histogram HAB that the distribution of the strength levels varies according to a Gaussian curve centered on the value −68.

This is the reason why it seems fairly reliable to consider that, when the geometrical mean f of the strength levels $RSSI_A$, $RSSI_B$ is greater than or equal to −68, that means that the mobile terminal 20 is inside the motor vehicle.

It is understood however from this Gaussian curve that, although the method gives more reliable results when the two antennas are considered in combination rather than just one antenna, this reliability is not absolute.

To optimize the reliability of this method, it will then be advantageous to use not the strength levels $RSSI_A$, $RSSI_B$ of a single pair of received signals $S2_A$, $S2_B$, but rather the strength levels $RSSI_A(k)$, $RSSI_B(k)$, of several pairs of received signals $S2_A(k)$, $S2_B(k)$, received at successive instants k.

In other words, it will be advantageous to consider not only a single pair signals of received at a given instant, but several pairs of signals received over a time interval made up of finite number of instants k. It will be possible to consider the last M instants k.

For that, the controller 12 will be able to transmit successive requests to the mobile terminal 20, such that the latter returns a plurality of transmitted signals S1 at successive instants k. Then, the controller 12 will acquire several pairs of received signals $S2_A(k)$, $S2_B(k)$, respectively exhibiting strength levels $RSSI_A(k)$, $RSSI_B(k)$. It will then be possible, to determine the position of the mobile terminal 20 inside or outside the interior of the motor vehicle 10, to consider the geometrical mean of the mathematical functions $f_k$, where:

$$f_k = (RSSI_A(k)^2 \cdot RSSI_B(k)^2)^{1/2}$$

It will then be estimated that the mobile terminal 20 is situated inside the interior of the motor vehicle 10 if the result of this mathematical function $f$ is greater than −68.

Once the mobile terminal 20 has been detected as being situated inside the interior of the motor vehicle, the controller 12 will verify whether the mobile terminal 20 is effectively authorized to start the engine of the motor vehicle.

This operation will for example be able to consist in verifying that a second valid virtual key is stored in the memory 24 of the mobile terminal 20.

The present invention is in no way limited to the embodiment described and represented, but the person skilled in the art will be able to provide any other variant thereto.

Thus, by way of example, it would be possible to consider that, in the step a), the transmitted signal S1 is transmitted by the controller 12, and that the step b) (see also the step c) are implemented by the processor of the mobile terminal 20. In effect, the processor of the mobile terminal 20 could be used to measure the strength levels of the signals that it receives, one of these signals having passed through the first antenna $16_A$ while the other of these signals will have passed through the second antenna $16_B$.

According to another variant of the invention, the electronic control unit 11 could comprise 3 antennas, or, more generally, P antennas (with P greater than or equal to 2). It will be recalled on this subject that the geometrical mean of P strength levels are $RSSI_i$ is equal to:

$$\sqrt[P]{\prod_{i=1}^{P} RSSI_i}$$

According to another variant, provision could be made to vary the strength of the transmitted signals as a function of the situation and of the state of the system.

More specifically, it will be possible to obtain an enhanced accuracy in the determination of the distance separating the vehicle from the mobile terminal by varying the strength of the transmitted signal (which amounts to adding another parameter in the mathematical equations for determining the abovementioned distance).

As an illustrative example, if one of the antennas has an overall gain substantially lower than the other, it will be possible to compensate this gain by transmitting a signal of greater strength when this antenna is used. The aim will thus be to harmonize the coverages of the two antennas.

Also as a variant, by virtue of the two antennas $16_A$, $16_B$, it will be possible to increase the transmission and reception range of the electronic control unit 11 beyond the envelope circumscribed on the two radiation patterns $D_A$, $D_B$ (see FIG. 3), so as to cover all of the zone $D_{AB}$ represented in FIG. 3.

For that, it will be necessary to apply to the received signals $S2_A$, $S2_B$ a predefined mathematical function.

As an example, a combinatory operation on the zones covered by the two antennas $16_A$, $16_B$, with a sliding processing of the data of the antennas and a temporal weighting to define whether the user is approaching or moving away from the vehicle, will make it possible to obtain good results. In other words, it will be possible to seek to determine the direction of variation of the distance separating the vehicle from the mobile terminal, in order to deduce therefrom whether the mobile terminal is moving away from or approaching the vehicle.

Also as a variant, it would be possible to provide for the use of a first antenna having a range confined within the interior of the vehicle, and a second antenna having a greater range (of at least several meters). In this variant, it will be easy to reliably verify whether the mobile terminal 20 is inside the interior. It will be sufficient for that to check that the first antenna is able to receive the signals transmitted by the mobile terminal 20.

Also as a variant, it would be possible to provide for the use of a highly directional first antenna, having a very high range in a given direction (for example toward the door of the driver) and having a much more reduced range in the other directions. The second antenna will be able for its part to be chosen so as to have a range that is substantially constant in all the directions.

Also as a variant, it would be possible to provide for the use of the signals received on at least two antennas to determine, as a function of the ratios of the RSSI measurements received on two antennas, an angle of arrival of the signal. This angle of arrival making it possible to locate the mobile terminal with better accuracy. For that, a calibration or a learning of the radiation patterns will have to be performed in order to have a relationship between the antennas and the angle of arrival. Advantageously, this calibration will be able to be performed directly with the antennas positioned on the vehicle.

The invention claimed is:

1. An electronic control unit for equipping a motor vehicle, comprising:
   a first antenna;
   a controller connected to said first antenna for controlling a functionality of the vehicle as a function of signals exchanged with a mobile terminal via said first antenna; and
   a second antenna which exhibits electromagnetic properties and/or a position that are different from those of said first antenna and to which the controller is connected, wherein the controller controls the functionality of the vehicle as a function of signals exchanged with the mobile terminal via said second antenna;
   the first antenna exhibiting a first radiation pattern that includes a first plurality of main lobes; and
   the second antenna exhibiting a second radiation pattern that includes a second plurality of main lobes,
   wherein the first plurality of main lobes are oriented in different directions from those of the second plurality of main lobes,
   wherein an envelope circumscribed on the first and second radiation patterns, with respect to a two-dimensional graphic representation, is maintained, based on orientations of the first plurality of main lobes of the first antenna and orientations of the second plurality of main lobes of the second antenna, to be as circular as possible, wherein:

when a transmission and reception strength of one of the first and second antennas is low in a given direction and generates a shadow zone, the other one of the first and second antennas allows the shadow zone to be masked, and a quality of exchanges between the mobile terminal and the controller is maintained regardless of a relative angular position of the mobile terminal with respect to the vehicle.

2. The electronic control unit as claimed in claim 1, in which the first and second antennas exhibit different positions via being situated at a distance from one another greater than a quarter of the minimum wavelength used to communicate with the mobile terminal.

3. The electronic control unit as claimed in claim 1, in which the first and second antennas exhibit different positions via being oriented in directions inclined relative to one another by an angle greater than 10 degrees.

4. The electronic control unit as claimed in claim 1, in which the first and second antennas exhibit different electromagnetic properties via exhibiting radiation patterns of different forms.

5. A method for controlling access to at least one functionality of a motor vehicle by a user equipped with a mobile terminal, said motor vehicle being equipped with an electronic control unit in accordance with claim 1, comprising:
   a) transmission by the mobile terminal, or respectively by the controller, of a transmitted signal;
   b) reception by the controller, or respectively by the mobile terminal, of a first received signal having passed through the first antenna and exhibiting a first strength level and of a second received signal having passed through the second antenna and exhibiting a second strength level;
   c) measurement of the first and second strength levels;
   d) verification, applied as a function of the first and second strength levels, during which the controller verifies that the mobile terminal is authorized to access said functionality; and
   e) when the mobile terminal is authorized to access said functionality, authorization by the electronic control unit for access to said functionality.

6. The control method as claimed in claim 5, in which, in the step d), the controller uses only the received signal whose strength level is the highest.

7. The control method as claimed in claim 5, wherein:
   in the step c), provision is made to assess the distance separating the electronic control unit from the mobile terminal, as a function of the first and second strength levels, and
   in the step d), the mobile terminal is authorized to access said functionality only if said distance is less than a predetermined threshold.

8. The control method as claimed in claim 7, in which, in the step c), said distance is assessed by means of a mathematical function which is applied to said first and second strength levels and which makes it possible to distinguish the case where said mobile terminal is situated in the interior of the motor vehicle from the case where said mobile terminal is situated outside the interior of the motor vehicle.

9. The control method as claimed in claim 8, in which said mathematical calculation consists of a mathematical combination of said first and second strength levels, as a geometrical mean of said first and second strength levels.

10. The control method as claimed in claim 5, in which, in the step a), the transmitted signal is transmitted by the mobile terminal, and the steps b) to e) are applied by the controller.

11. The control method as claimed in claim 5, in which, in the step a), the transmitted signal is transmitted by the controller, and the steps b) and c) are applied by the mobile terminal.

12. The electronic control unit as claimed in claim 1, in which a first main lobe of the first antenna is oriented in a direction where a transmission and reception strength of the second antenna is lowest.

* * * * *